United States Patent

Dutot

[15] 3,649,090
[45] Mar. 14, 1972

[54] DEVICES FOR GUIDING MOVABLE ASSEMBLIES

[72] Inventor: Christian Dutot, Billancourt, France

[73] Assignees: Regie Nationale Des Usines Renault, Billancourt, France; Automobiles Peugeot, Paris, France

[22] Filed: May 5, 1970

[21] Appl. No.: 34,832

[30] Foreign Application Priority Data

May 8, 1969 France.................................6914744

[52] U.S. Cl............................................308/36, 312/341 NR
[51] Int. Cl..............................................F16c 29/00
[58] Field of Search....................308/3.6, 3.8; 312/334, 346, 312/347, 348, 341 NR, 349, 350; 108/83, 87, 88, 89, 143

[56] References Cited

UNITED STATES PATENTS

| 2,733,972 | 2/1956 | Diack.................................312/348 |
| 1,751,899 | 3/1930 | Whitfield...........................312/350 |
| 2,759,773 | 8/1956 | Wilmer.........................312/341 NR |
| 2,985,491 | 5/1961 | Hayes....................................308/3.8 |
| 2,964,093 | 12/1960 | Lohr et al..............................308/3.8 |

FOREIGN PATENTS OR APPLICATIONS

| 1,210,451 | 9/1958 | France.........................312/341 NR |

*Primary Examiner*—Martin P. Schwadron
*Assistant Examiner*—Ronald H. Lazarus
*Attorney*—Stevens, Davis, Miller & Mosher

[57] ABSTRACT

Device for guiding an assembly displaceable along a plane or a curved surface, which comprises complementary movable elements, that is, a supporting element associated with a fixed support and a supported element associated with the movable assembly, characterized in that the supporting and supported elements consist both of metal sections, advantageously of same and consist cross-sectional contour, each element having formed in its portion parallel to the axis of movement a plurality of punched openings each forming a lug extending at right angles to said opening and bearing on one portion of the complementary element constituting a slideway, said lugs being so disposed that said elements are in constant bearing engagement irrespective of their relative longitudinal positions, the supporting element comprising a flexible channel constituting a friction race.

4 Claims, 3 Drawing Figures

Patented March 14, 1972 3,649,090
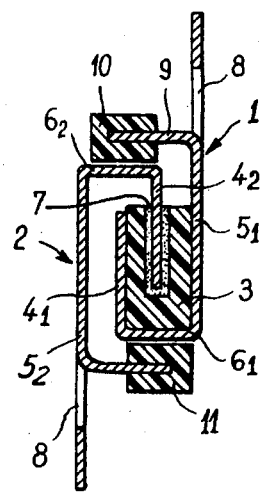
Fig-1
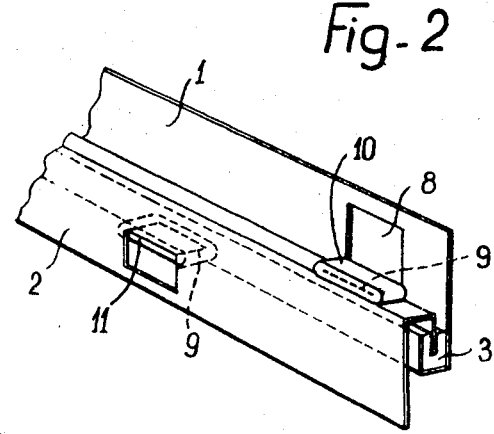
Fig-2
Fig-3
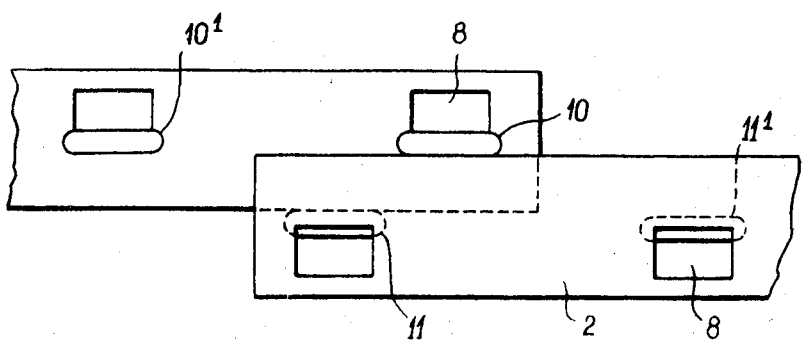
INVENTOR
CHRISTIAN DUTOT
BY
*Stevens, Davis, Miller & Mosher*
ATTORNEYS

DEVICES FOR GUIDING MOVABLE ASSEMBLIES

The present invention relates to means for guiding an assembly movable along a plane or a curved surface, and is applicable notably but not exclusively to slideways of a drawer mounted in the dashboard of an automotive vehicle.

The problem of slideways and the like is generally rather complicated and requires the use of many parts having friction and guiding characteristics.

Hitherto known slideways or sliding mountings comprise as a rule a fixed element and, in order to impart the maximum smoothness to the sliding movements of the assembly, a pair of movable elements movable in relation to each other, as well as rolling-contact elements such as rollers or balls.

The inconveniences characterizing these known assemblies are chiefly their high cost and the noise produced during their actuation.

It is the object of the present invention to provide a device for guiding sliding or movable assemblies of the type broadly defined hereinabove which permits of eliminating said inconveniences while being of relatively low cost and being extremely noiseless during the guiding of the movable part and preserving the advantageous features of known assemblies.

This device comprising complementary movable elements, that is, a supporting element associated with a fixed support and a supported element associated with the movable assembly, is characterized essentially in that the supporting and supported elements consist both of metal sections, advantageously of same and constant cross-sectional contour, each element having formed in its portion parallel to the axis of movement a plurality of punched openings each forming a lug extending at right angles to said opening and bearing on one portion of the other complementary element constituting a race, said lugs being so disposed that said elements are in constant bearing engagement irrespective of their relative longitudinal positions, the supporting element comprising a flexible channel constituting a friction race.

According to another feature characterizing this invention the punched lugs are disposed on the two elements at alternate positions in relation to each other, so that the bearing portions of these two elements constantly engage the perpendicular lugs.

Other features and advantages of this invention will appear as the following description proceeds with reference to a specific form of embodiment of the invention illustrated in the accompanying drawing, in which:

FIG. 1 is a cross section showing the slideway or guiding mounting of this invention;

FIG. 2 is a perspective view of the same assembly, and

FIG. 3 is a diagrammatic elevational view showing the two elements of the device in their endmost position.

Referring first to FIG. 1, it will be seen that the device comprises two slideways consisting of metal sections 1 and 2 of same cross-sectional contour, disposed symmetrically and adapted to slide in relation to each other.

By way of example, the slideways have a U-shaped cross-sectional contour with unequal parallel wings and relatively sharp corners.

The first section 1 constituting the supporting element is movable in a fixed support (not shown) ; this element constitutes the rolling race of the assembly and comprises a plastic channel 3 having a felt inner lining or a flocked insert 7. This channel has likewise a U-shaped cross section and is similar to the glass window channels currently used in automobile body construction ; it is force-fitted between the wings $4_1$ and $5_1$ of section 1 and rest with its transverse portion upon the bottom $6_1$ of the U-section element 1 ; however, it may also be glued thereto.

The other slideways 2 disposed upside-down in relation to slideway 1 constitutes the supported element and is rigid with the movable element or structure (not shown). Its shorter wind $4_2$ engages the channel 3 of which the felt or flocked lining or insert 7 constitutes a noiseless guide and a friction race when the two elements 1 and 2 are moved in relation to each other.

The longer wing $5_1$ or $5_2$ of each section element 1 or 2 has formed therein, by punching, a number of openings 8 forming as many lugs 9 of which the outer edges project beyond the shorter wing ; these lugs extending at right angles to the wings of the relevant section are covered with sleeves 10 and 11 acting as bearings engaging the base or transverse portion $6_1$ or $6_2$ of the complementary slideway. These sleeves consist of a flexible plastic material having a relatively low coefficient of friction, such as the products known under the Trademarks "Delrin" or "Rilsan."

The dimensions of the cross-sectional contour of the slideways are so calculated that a movement can take place therebetween both vertically and laterally.

The punched openings 8 are so distributed that when the two slideways register with each other as shown in FIG. 2 the sleeves 10 and 11 of elements 1 and 2 are staggered from each other.

This arrangement is advantageous in that even in the endmost positions of the two section elements as shown in FIG. 3 each element 1 or 2 bears with the bottom or transverse portion $6_1$ of is U-shaped section against a sleeve 11 or 10, thus affording a proper positioning of the assembly. The successive sleeves $10_1$, $10_2$, $10_3$, etc... and $11_1$, $11_2$, $11_3$, etc., are adapted to guide the end portion of section elements 1 and 2 each time these are caused to engage a sleeve.

Of course, it would not constitute a departure from the basic principle of this invention to use elements 1 and 2 having different contours, provided that they are capable of preventing the untimely disconnection or transverse displacement of the movable assembly.

This invention is applicable to any guided body movable in a plane or along a curved path defined by a radius ; it is thus advantageously applicable to the construction of a drawer or like structure.

I claim:

1. A device for guiding an assembly displaceable along a plane or a curved surface, comprising complementary movable elements, the first of which is a supporting element associated with a fixed support, and a second of which is a supported element associated with a movable assembly, both of said elements comprising metal sections each having a constant cross-sectional shape and advantageously of the same size, said cross-sectional shape being that of a channel having two unequal wings disposed parallel to the axis of movement and a portion connecting the wings, said portion perpendicular to said axis of movement, each element having formed in its longer wing a plurality of punched openings, a lug extending at right angles from each opening and said lug bearing on said connecting portion of the complementary element thereby constituting a slideway, said lugs being so disposed that said elements are in constant bearing engagement irrespective of their relative longitudinal position, while said supporting element additionally comprises a flexible channel constituting a friction race for the shorter wing of said supported element engaged in said flexible channel.

2. A guiding device according to claim 1, wherein a sleeve covers each said perpendicular lug, said sleeve comprising a plastic material having a low coefficient of friction.

3. A guiding device according to claim 2, wherein said sleeves are disposed in staggered relationship when said two elements register with each other.

4. A guiding device according to claim 1, wherein said flexible channel is inserted in the channel formed by said supporting element and comprises a suitable plastic material having an inner felt or flocked lining.

* * * * *